3,759,703
USE OF THERMAL REGENERATOR PAIR IN
SODIUM RECOVERY PROCESS
Victor Manuel Chong, Media, Pa., assignor to Sun
Research and Development Co., Philadelphia, Pa.
Filed Nov. 15, 1971, Ser. No. 198,819
Int. Cl. C22b 27/00
U.S. Cl. 75—66                3 Claims

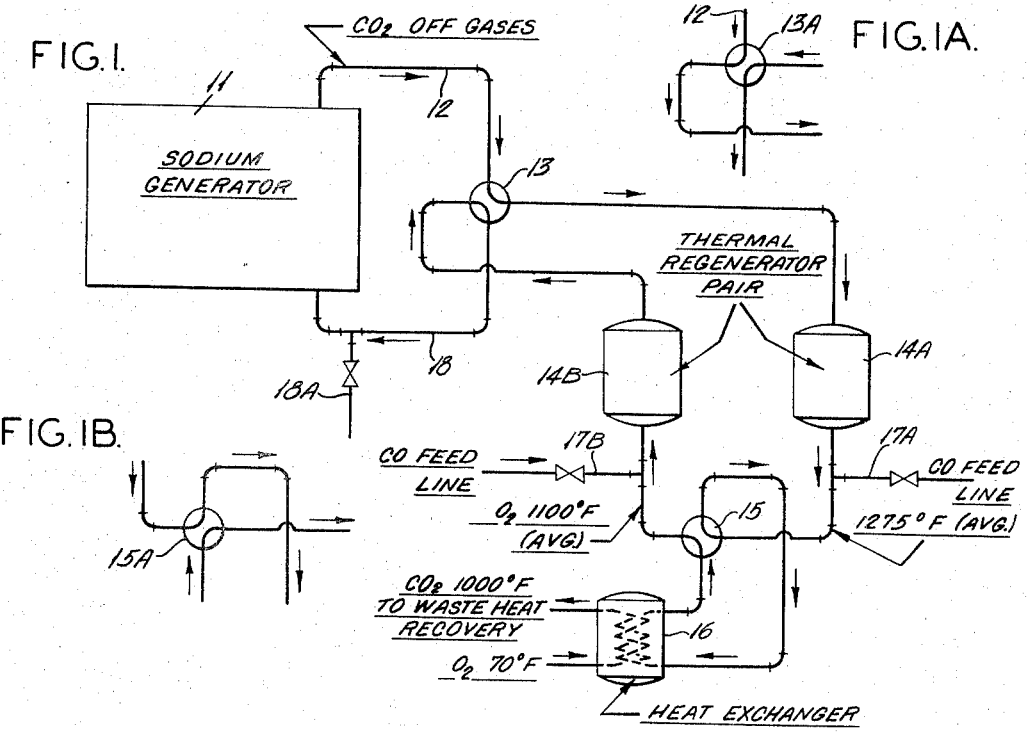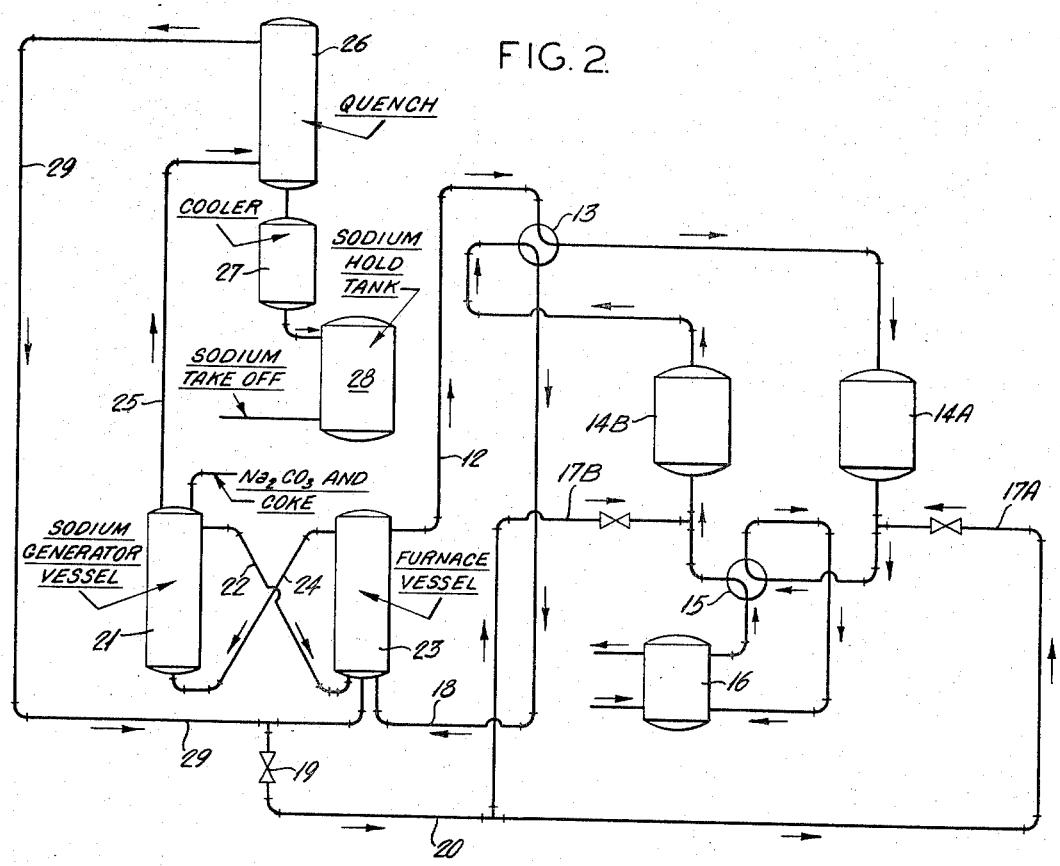

ABSTRACT OF THE DISCLOSURE

In a sodium generation system where sodium carbonate and coke are reacted to generate sodium, the improvement comprising the cyclic operation of a pair of thermal regenerators whereby in one half-cycle the $CO_2$ off gas from the sodium generator is passed through one of said regenerators having an internal temperature below the fusion point of sodium carbonate thereby trapping any volatilized carbonate in said regenerator, and in a second half-cycle, carbon monoxide is burned in said regenerator whereby the sodium compounds trapped in said regenerator are vaporized and returned with the exiting gases to said sodium generation system.

---

This invention relates to sodium generation systems where sodium carbonate and coke are reacted to form sodium and, in particular, is directed to an improved heat recovery system which also recovers sodium compounds which might otherwise be lost.

Because of the high temperatures involved in making sodium by reaction of sodium carbonate and coke, it is economical to recover heat from the by-product $CO_2$ off gases. A convenient means to accomplish this heat recovery is with the well-known thermal regenerators such as those described in Chemical Engineering Handbook, 4th ed., pgs. 9–61 to 9–64. A useful example is the coke oven "pebble-bed" heat exchanging structure which contains large masses of refractory to store heat and are operated cyclically in pairs. During the first half of the cycle, heat from furnace off gases is used to heat one regenerator; during the second half of the cycle, flows are reversed and the regenerator releases stored heat to an air or oxygen stream which subsequently goes to the furnace for combustion. The second regenerator is on the opposite half cycle from the first.

In the process of this invention, such cyclic regenerators are employed in a particular manner so that not only is heat recovered, but any sodium carbonate which escapes from the sodium generator is also recovered and subsequently fed back to the sodium generator for conversion to sodium product. Thus, in accord with this invention, there is provided an improved thermal recovery process useful in systems generating sodium from sodium carbonate and coke whereby the $CO_2$ off gases from such sodium generation are passed through a pair of thermal regenerators in cyclic operation, in one half-cycle the $CO_2$ off gas passing through one of said regenerators at a temperature below the fusion point of sodium carbonate (about 850° C.) thereby trapping any volatilized carbonate in said regenerator, and in a second half-cycle, carbon monoxide is burned in said regenerator whereby the sodium compounds trapped in said regenerator are revaporized and returned with the exiting gases to said sodium generation system.

BRIEF DESCRIPTION OF THE DRAWINGS

FIG. 1 illustrates the sodium generator from which $CO_2$ off gases are taken to a thermal regenerator pair in accord with the invention.

FIG. 1A and 1B illustrates the valve mechanism to reverse the flow of gases.

FIG. 2 illustrates a process in which the sodium is generated in a preferred system.

In order to illustrate the invention, reference is made to FIG. 1.

As shown in FIG. 1, the $CO_2$ off gases from sodium generator 11 are conducted through line 12 and thence through reversible valve 13 to one of the cyclicly operated thermal regenerators 14A. This regenerator operates in this half-cycle so as to have an internal temperature below the fusion point of sodium carbonate which is about 850° C. and it is during this half-cycle that any sodium carbonate carried over by the off gases condense within the regenerator. The cooled gases exit at about 1275° F. (690° C.) and pass through reversible valve 15 and thence through heat exchanger 16, exiting at about 1000° F. (538° C.) and proceding to waste heat recovery, if desired. During this half cycle, regenerator 14B is operating to volatize the condensed sodium compounds and use its stored heat. This is achieved by means of a two step operation. In the first step, oxygen (air) enters heat exchanger 16 and then, after passing through reversible valve 15, enters regenerator 14B together with CO from line 17B (CO feed line 17A is closed in this half-cycle). The CO burns and generates sufficient heat to volatilize the sodium compounds and provides additional heat to the regenerator bed. With oxygen at an initial temperature of 1100° F. and the CO at an initial temperature of 500° F., at least 0.13 lbs. of CO per pound of oxygen will be burned to raise the bed to 1500° C. (~2700° F.) which is the approximate bed temperature when all the carbonate has been vaporized. Then, in a second step, the flow of CO is shut off at 17B and the oxygen continues to flow through the system and will take up heat from the regenerator bed. The vapors of sodium carbonate from the regenerator 14B pass through valve 13 and thence are returned through line 18 to the sodium generator 11. The heated oxygen, if not needed in the sodium generation system, may be taken through line 18A for use in the plant.

When the temperature of regenerator 14B falls below the fusion temperature of the carbonate, the cycle is changed by reversing valves 13 and 15, their opposite positions being shown at 13A (FIG. 1A) and 15A (FIG. 1B) and closed CO feed line 17A is opened. In this way, regenerator 14A is operated through the two steps described above and 14B functions to trap the sodium carbonate carried over from the sodium generator.

In a preferred technique the thermal regenerators used in accord with this invention will be incorporated in the sodium generation and recovery process described and claimed in my co-pending application S.N. 177,270, filed Sept. 2, 1971, now abandoned. This preferred process involves the generation of sodium metal from sodium carbonate and coke by feeding particulate coke and sodium carbonate to a sodium generator vessel, conducting molten sodium carbonate containing unreacted coke by gravity flow from the upper portion of the generator to the bottom of a furnace, the furnace being fed with an oxygen containing gas to obtain essentially complete combustion of the coke, recirculating the molten sodium carbonate by gravity flow from an upper portion of the furnace vessel to the bottom of the generator vessel, conducting vapors of carbon monoxide and sodium from the generator vessel to a quench system, recovering condensed liquid sodium from the bottom of the quench system, the carbon monoxide gas being taken from the quench system and introduced to the furnace vessel for combustion to carbon dioxide, the carbon dioxide off gases being conducted to the thermal regenerator units discussed above and a portion of the carbon monoxide from said quench system being burned in the regenerators to vaporize any condensed sodium compounds as explained above. This preferred system is illustrated by FIG. 2. As shown in the drawing, a mixture of particulate sodium carbonate and coke is fed into sodium generator vessel 21. This sodium generator is maintained at about 2200° F. to 2300° F. and here sodium is generated in accord with the following equation:

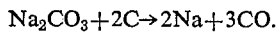

$$Na_2CO_3 + 2C \rightarrow 2Na + 3CO.$$

The sodium carbonate in generator 21 is molten and is circulated from bottom to top of the generator by the upward flow of CO and sodium vapor. From the top of generator 21, molten sodium carbonate and entrained coke flow by gravity through line 22 to the bottom portion of a furnace vessel 23, which is held at about 2700° F. Oxygen, air or other source of oxygen from the thermal regenerator pair is introduced into the bottom of the furnace 23 through line 18 to completely burn entrained coke and to oxidize to $CO_2$ the CO from the quench system 26 which is carried to the furnace vessel through line 29. The energy released by coke-CO combustion in furnace 23 is absorbed by the molten sodium carbonate, which is circulated from the bottom to the top of the furnace by the upward flow of gaseous combustion products. It will be understood that only part of the coke is used for the actual chemical reaction (0.52 lb. coke/lb. Na produced, stoichiometric). The rest of the coke (0.18 lb. if no losses) is burned for heat. At least part of this latter portion may be replaced by some other fuel fed directly to furnace 23. From the top portion of furnace 23, the molten carbonate flows by gravity through line 24 to the bottom portion of the sodium generator 21. Since the bulk of material in the generator 21 will be aerated with CO and sodium vapor, the average density of this material will be less than that of the substantially non-aerated molten carbonate in line 24. Likewise, since the bulk of material in the furnace 23 is aerated with combustion product gases, the average density of this material will be less than the substantially non-aerated material in line 22. These density differences cause the characteristic top-to-bottom gravity flow between generator 21 and furnace 23. It is to be expected that some aeration will occur in the lines especially in line 22 where coke could react with $Na_2CO_3$ to form sodium and CO vapors. However, this aeration will not be enough to inhibit flow, since line 22 will be relatively cold compared to the bottom of the generator 21, where the bulk of sodium and CO are formed. No pumping equipment need be used in this circulating system and this makes for a more economical and efficient process devoid of maintenance problems which would result from the highly corrosive action of the sodium carbonate melt. Because of the corrosive nature of the sodium carbonate, however, it is necessary to select materials of construction which have adequate resistance and a preferred material is fused-cast alumina, which is commercially available for construction purposes in a variety of standard forms and sizes made to specification.

The metallic sodium vapors generated in the generator 21 are taken overhead together with the carbon monoxide vapors produced in accord with the above equation through line 25 to a quench system 26 where the sodium is condensed to liquid metal, cooled in cooler 27, and may be stored in a hold tank 28 from which it is recovered.

Alternatively, the condensed sodium may be vaporized with waste heat from furnace 23 for direct chemical use or heat transfer purposes, such as in a process for desulfurization of residual oil. In any event, the CO separated from the sodium is recycled through line 29 to furnace vessel 23 where it is completely oxidized to $CO_2$. A portion of the CO in line 29 may be trapped and taken through valve 19 and through line 20 as a source of CO for the thermal regenerator pair which enters that system at 17A and 17B.

The $CO_2$ off gases from furnace vessel 23 of the sodium generation system are taken through line 12 to the thermal regeneration system which functions as already explained above. Thus, the invention provides an integrated sodium generation system which not only manufactures sodium in an economical manner, but also efficiently uses all heat in the system. The invention thus provides a valuable contribution to the art.

The invention claimed is:

1. In a sodium generation system where sodium carbonate and coke are reacted to make sodium and an off gas comprising carbon dioxide containing volatilized sodium carbonate is formed, the improvement in combination therewith comprising the cyclic operation of a pair of thermal regenerators whereby in one half-cycle the $CO_2$ off gas from the sodium generation system is passed through one of said regenerators having an internal temperature below the fusion point of sodium carbonate thereby trapping any volatilized sodium carbonate in said regenerator, and in a second half-cycle, carbon monoxide is burned in said regenerator whereby the sodium compounds in said regenerator are vaporized and returned to said sodium generation system.

2. In a sodium generation system where sodium carbonate and coke are reacted to make sodium and an off gas comprising carbon dioxide containing volatilized sodium carbonate is formed, the improvement in combination therewith comprising the cyclic operation of a pair of thermal regenerators whereby in one half-cycle the $CO_2$ off gas from the sodium generation system is passed through one of said regenerators at a temperature below the fusion point of sodium carbonate thereby trapping any volatilized sodium carbonate in said regenerator, and in a second half-cycle, carbon monoxide is burned in said regenerator whereby the sodium compounds in said regenerator are vaporized and returned with the exiting gases to said sodium generation system and heat within said regenerator is recovered by the flow of oxygen therethrough.

3. A thermal process for the generation of sodium metal from sodium carbonate and coke which comprises feeding particulate coke and sodium carbonate to a sodium generator, conducting molten sodium carbonate containing unreacted coke by gravity flow from the upper portion of the generator to the bottom of a coke burning furnace, said furnace being fed with oxygen to obtain essentially complete combustion of the coke, recirculating the molten sodium carbonate by gravity flow from an upper portion of the furnace to the bottom of the generator, conducting vapors of carbon monoxide and sodium from the generator to a quench system, recovering condensed liquid sodium from the bottom of the quench system, the carbon monoxide exiting from the quench system being returned to the furnace for conversion to carbon dioxide, the $CO_2$ off gases and volatilized sodium carbonate from said coke burning furnace entering one of a pair of cyclicly operated thermal regenerators having an internal temperature below the fusion point of sodium carbonate thereby trapping any of said volatilized carbonate in said regenerator but allowing $CO_2$ gas to pass through, burning carbon monoxide in the second of said regenerator pair to generate sufficient heat to volatize any sodium carbonate previously trapped therein, returning the thus volatilized sodium carbonate to said sodium generator system, and recovering heat within said generator by the continued flow of oxygen which is fed to said coke burning furnace.

References Cited

UNITED STATES PATENTS

| | | | |
|---|---|---|---|
| 2,930,689 | 3/1960 | McGriff | 75—66 |
| 3,472,907 | 10/1969 | Coberly | 165—5 X |
| 3,023,836 | 3/1962 | Kasbohn et al. | 165—5 X |
| 3,412,786 | 11/1968 | Taylor | 165—5 |
| 2,484,266 | 10/1949 | Bowe | 75—66 |

L. DEWAYNE RUTLEDGE, Primary Examiner

M. J. ANDREWS, Assistant Examiner

U.S. Cl. X.R.

165—5